(12) United States Patent
Shaw

(10) Patent No.: US 8,509,729 B2
(45) Date of Patent: Aug. 13, 2013

(54) INTERACTIVE PERSONAL EMERGENCY COMMUNICATIONS

(75) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 755 days.

(21) Appl. No.: 12/620,272

(22) Filed: Nov. 17, 2009

(65) Prior Publication Data

US 2011/0117874 A1 May 19, 2011

(51) Int. Cl.
*H04M 11/04* (2006.01)

(52) U.S. Cl.
USPC ............ 455/404.1; 455/521; 455/404.2; 455/456.1; 455/440; 370/356; 709/218

(58) Field of Classification Search
USPC ............ 455/404.1, 404.2, 456.1, 521, 440, 455/567; 370/356, 328, 338; 709/223, 224, 709/218
See application file for complete search history.

(56) References Cited

U.S. PATENT DOCUMENTS

| | | | |
|---|---|---|---|
| 7,206,788 B2 * | 4/2007 | Horvitz et al. ................. | 1/1 |
| 2002/0112187 A1 * | 8/2002 | Dalton et al. ................. | 713/201 |
| 2002/0184346 A1 * | 12/2002 | Mani ............................. | 709/220 |
| 2003/0195814 A1 * | 10/2003 | Striemer ........................ | 705/26 |
| 2004/0038688 A1 * | 2/2004 | Zabawskyj et al. ......... | 455/456.3 |
| 2004/0052233 A1 * | 3/2004 | Skog et al. ................... | 370/338 |
| 2004/0152441 A1 * | 8/2004 | Wong ............................ | 455/404.1 |
| 2004/0152493 A1 * | 8/2004 | Phillips et al. ............... | 455/567 |
| 2005/0151642 A1 * | 7/2005 | Tupler et al. ................. | 340/539.18 |
| 2005/0245232 A1 * | 11/2005 | Jakober et al. .............. | 455/410 |
| 2007/0094387 A1 * | 4/2007 | Hahn et al. ................... | 709/224 |
| 2008/0293387 A1 * | 11/2008 | Conn et al. ................... | 455/414.1 |
| 2009/0156180 A1 * | 6/2009 | Slavin et al. ................. | 455/414.1 |

OTHER PUBLICATIONS

Derwent Acc-No. 2006-00787 Title: Emergency help service provision method for electronic help service, involves transmitting message and phone number of emergency service provider to internet protocol address when alert level equals to preset criterion 2006.*

* cited by examiner

*Primary Examiner* — Kamran Afshar
*Assistant Examiner* — Marisol Fahnert
(74) *Attorney, Agent, or Firm* — Woodcock Washburn LLP

(57) ABSTRACT

Emergency alert messages are received from an emergency service or governmental agencies and modified according to user, user group, or device characteristics or preferences. Emergency alert messages are appended with source identifiers that can be used by users to respond to such alert messages. The emergency alert messages and the response messages can include multimedia content. Emergency alert messages received on a user device can be transmitted to other devices using various means, including short distance wireless communications protocols.

20 Claims, 10 Drawing Sheets

INTERACTIVE PERSONAL EMERGENCY COMMUNICATIONS

TECHNICAL FIELD

The technical field generally relates to wireless communications and more specifically relates to interactive emergency communications.

BACKGROUND

The Commercial Mobile Alert System (CMAS) was established by the Federal Communications Commission (FCC) as an emergency alert message system that allows wireless service providers to send emergency alerts originating with emergency service agencies to their subscribers. Such alerts are typically in the form of text messages. The CMAS network allows emergency service agencies, such as the Federal Emergency Management Agency (FEMA), to send the alerts over a secure interface to wireless providers. The wireless providers can then distribute the alerts to their customers.

Current standards allow a government agency to deliver limited emergency message types to end user devices. All messages sent must be the same message regardless of the intended recipients. Such messages are only permitted to be one-way and are not interactive in that a recipient cannot respond to a message or otherwise interact with the message or the agency with whom the message originated. Current emergency alert message systems only allows government emergency service agencies to originate emergency messages. Currently only mobile devices can receive the emergency messages. There is a need in the art to address these and other limitations of the current emergency alert message system.

SUMMARY

Systems and methods are disclosed for interactive personal emergency communications. In one embodiment, user, user group, or device preferences or attributes may be taken into account when constructing an emergency alert message and the emergency alert message may be appropriately modified. In another embodiment, users receiving emergency alert messages may be able to reply to such messages and send a response message providing information to emergency agencies. In another embodiment, multimedia content may be included in emergency alert messages and/or response messages. In yet another embodiment, multiple agencies may be configured to access a central alert gateway and transmit emergency alert messages. In still another embodiment, emergency alert messages may be transmitted from a user's wireless device to another device, such as a television or home computer. Response messages may also be composed and transmitted from such devices, in one embodiment through a wireless device. Other embodiments and aspects of the present disclosure are also described herein.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF ILLUSTRATIVE EMBODIMENTS

In one embodiment, interactive personal emergency communications may be provided using Universal Mobile Telecommunications System (UMTS) and/or Global System for Mobile communications (GSM) cell broadcast technologies. This disclosure provides methods and systems for providing interactive personal emergency communications.

Figure 1:
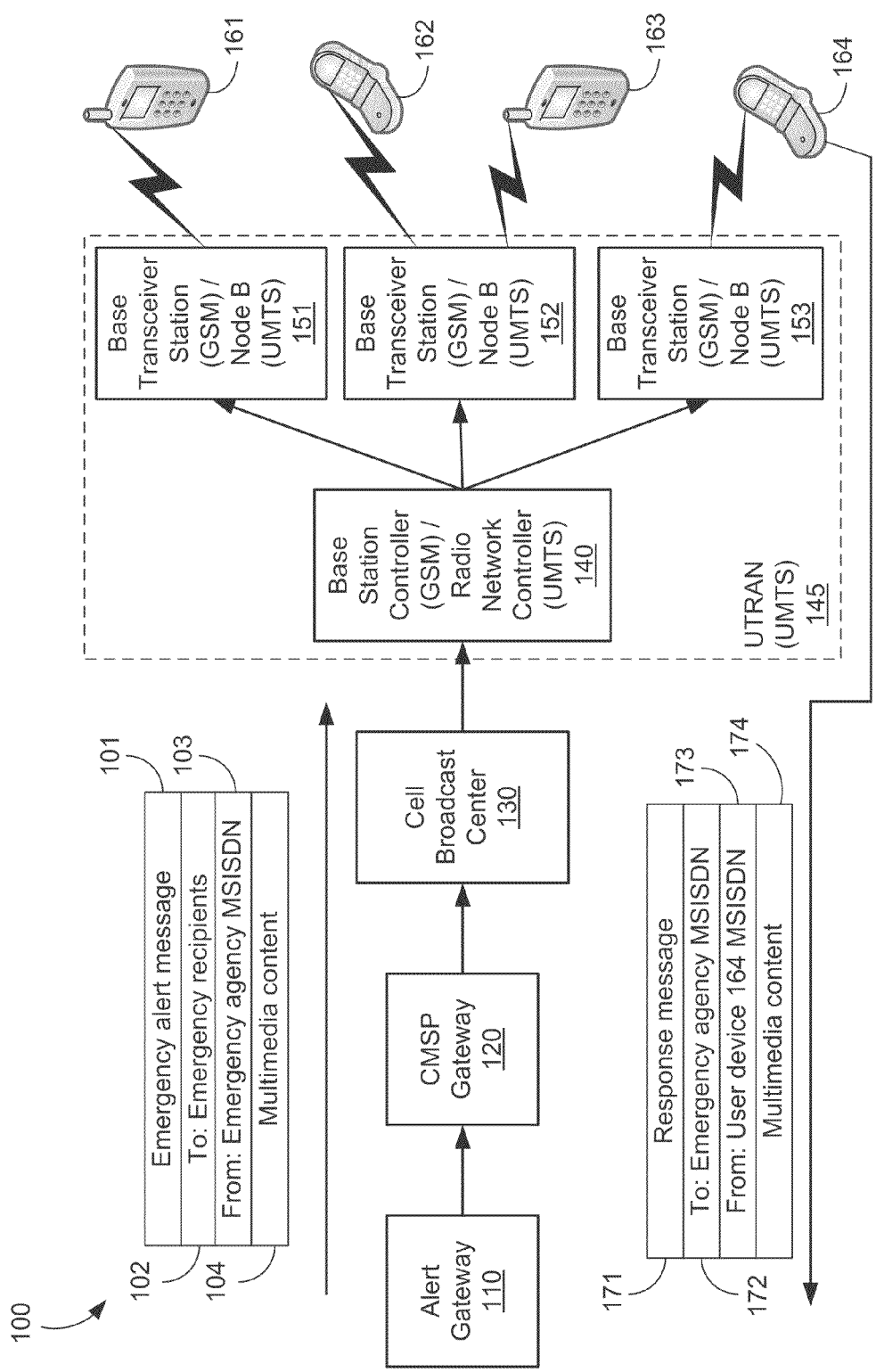
FIG. 1 is a block diagram of a non-limiting, exemplary system architecture in which interactive personal emergency communications may be implemented.

FIG. 1 illustrates an exemplary architecture 100 that may be used to provide interactive personal emergency communications using GSM and/or UMTS technologies. Emergency alert message 101 may be generated by a governmental or emergency services agency may be generated at or otherwise provided to a wireless carrier or wireless service provider by alert gateway 110. Emergency alert message 101 may have an associated destination 102 appended or otherwise associated with emergency alert message 101. Destination 102 may be one or more specific destination addresses or numbers associated with user devices, or it may be a code or other indicator used by an emergency alert system or wireless provider to determine appropriate destination devices. In one embodiment, emergency alert message 101 may also have an associated source number or address, such as source 103, described in more detail below.

Alert gateway 110 may be operated by a governmental or emergency services agency, such as FEMA. Alert gateway 110 may transmit emergency alert message 101 to commercial mobile service provider (CMSP) gateway 120. CMSP gateway 120 may be operated by a wireless service provider, and may be dedicated to receiving emergency alert messages from one or more alert gateways such as alert gateway 110. CSMP gateway 120 may communicate with alert gateway 110 using a secure data connection. All other configurations of alert gateways and CMSP gateways, and all other means of communication between such gateways, including wired, wireless, secure, unsecure, encrypted, and unencrypted, are contemplated as within the scope of the present disclosure.

In one embodiment, emergency alert message 101 may be transmitted from alert gateway 110 to CMSP gateway 120, and may be based on common alert protocol (CAP) key fields. Emergency alert message 101, in one embodiment combined with associated destination and source data, may be of various lengths. Upon receiving emergency alert message 101 from alert gateway 110, CMSP gateway 120 may process emergency alert message 101, including formatting emergency alert message 101 as necessary to provide the alert to mobile devices serviced by the wireless provider. Further processing may be performed to determine a set of the cells within the wireless provider network, in one embodiment based on data contained in destination 102, that are to be provided with emergency alert message 101 for transmission to users and devices within that cell. In the event that multiple emergency alert messages are received by CMSP gateway 120, CMSP gateway 120 will process the emergency alert messages in a first-in first-out manner, unless such messages are prioritized in some manner.

Once emergency alert message 101 is processed, CMSP gateway 120 may transmit processed emergency alert message 101 to cell broadcast center 130. In an alternative embodiment, emergency alert message 101 may not be altered by CMSP gateway 120, and may be transmitted to cell broadcast center 130 unchanged. In a GSM system, cell broadcast center 130 may transmit emergency alert message 101 to element 140, which may be a base station controller, for transmission to elements 151, 152, and/or 153, which may be base transceiver stations that may then transmit emergency alert message 101 to appropriate end user devices, such as wireless devices 161, 162, 163, and/or 164. Alternatively, in a UMTS system, cell broadcast center 130 may transmit emergency alert message 101 to element 140, which may be a UMTS radio network controller, for transmission to elements 151, 152, and/or 153, which may be UMTS Node Bs that may then transmit emergency alert message 101 to appropriate end user devices, such as wireless devices 161, 162, 163, and/or 164. In such a UMTS system, radio network controller 140 and Node Bs 151, 152, and 153 may comprise UMTS Terrestrial Radio Access Network (UTRAN) 145. Any other arrangement or alternative configuration, or any other devices or combination of devices, may be used to implement the functionality of the present systems and methods, and all such embodiments are contemplated as within the scope of the present disclosure.

In one embodiment, a user who receives an emergency alert message may respond to such a message. This may allow the user to transmit a request (for example for assistance), information (for example concerning an emergency situation), a status, or any other data to an emergency service agency or provider. For example, a user may operate wireless device 164 and receive emergency alert message 101 and associated source and destination data 102 and 103. The user may then operate wireless device 164 to compose response message 171, which may be transmitted from wireless device 164 to destination 172 through the devices described herein that are shown in FIG. 1, or through other devices and/or networks. Wireless device 164 may derive a destination number or address from source 103 to determine destination 172. In one embodiment, emergency alert message 101 may include or be associated with source 103 which may be a mobile subscriber integrated services digital network number (MSISDN) associated with an emergency service agency or provider. Wireless device 164, automatically or with user configuration, may send a reply message to this MSISDN. Response message 171 may also be associated with or appended to source 173, which may be a number or address associated with wireless device 164, such as an MSISDN or an international mobile subscriber identity (IMSI) associated with wireless device 164. Any other means of identifying or otherwise obtaining destination and source numbers, addressed, or other device or entity identification data may be used, and all such means are contemplated as within the scope of the present disclosure.

In one embodiment, the present systems and methods enable an emergency service agency or provider to send emergency messages that include multimedia content. Such content may be very helpful to those in emergency situations. For example, a picture, map, audio recording, video or other multimedia content may assist those in an emergency situation in dealing with the situation and/or taking steps to reach safety or otherwise secure themselves from harm. In one embodiment, embedded within, appended to, or otherwise associated with, emergency alert message 101 may be multimedia content 104. Multimedia content 104 may be transmitted through the devices and network elements described in regard to FIG. 1, or may be transmitted through any alternate means, with or separately from emergency alert message 101. Multimedia content 104 may include video, images, audio, text, any other multimedia content, or any combination thereof.

Similarly, it may be of use to emergency service agencies or providers to receive multimedia content from users in response to an emergency alert message such as emergency alert message 101. For example, emergency personnel may find it helpful to see video or images of damage in a disaster area before they arrive. In one embodiment, when composing response message 171, the user of wireless device 164 may also append or otherwise associate multimedia content 174 with response message 171. Multimedia content 174 may be transmitted through the devices and network elements described in regard to FIG. 1, or may be transmitted through any alternate means, with or separately from response message 171. Multimedia content 174 may include video, images, audio, text, any other multimedia content, or any combination thereof.

Figure 2:
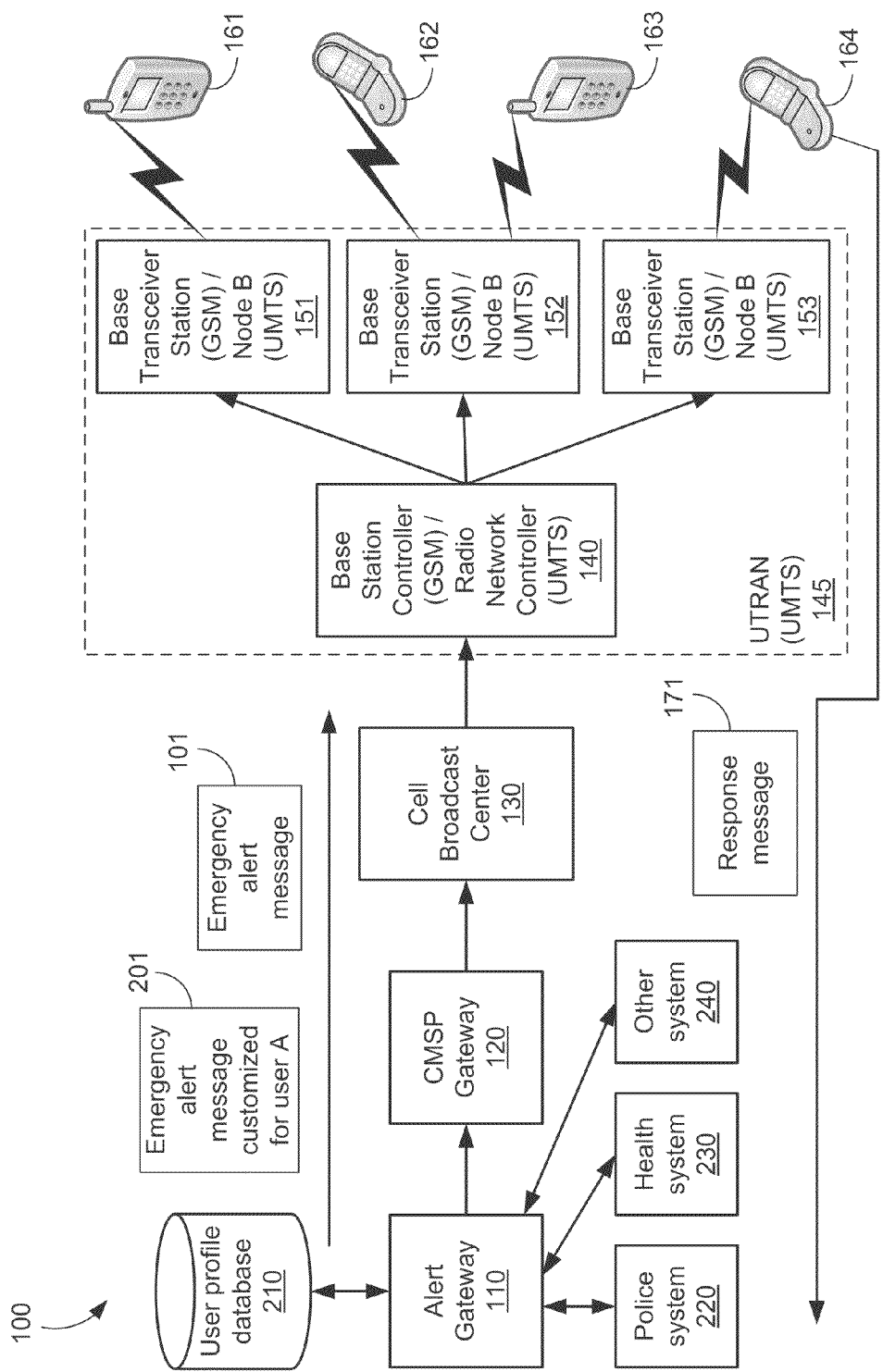
FIG. 2 is another block diagram of a non-limiting, exemplary system architecture in which interactive personal emergency communications may be implemented.

FIG. 2 illustrates an exemplary architecture 100 that may be used to provide interactive personal emergency communications using GSM and/or UMTS technologies, with additional exemplary elements that may be used in additional embodiments. In one embodiment, rather than limit access to an emergency alert system to a single emergency agency or provider, access may be provided to several agencies or providers, expanding the utility of such a system. In one embodiment, police emergency alert system 220 may be configured to communicate with alert gateway 110. This may allow local, state, national, or international police agencies to transmit and receive emergency notifications and responses in the event of an emergency. In another embodiment, health emergency alert system 230 may be configured to communication with alert gateway 110. This may allow local, state, national, or international health agencies to transmit and receive emergency notifications and responses in the event of an emergency. Any other emergency service provider system, such as other emergency alert system 240, may be configured to communicate with alert gateway 110 or any other device or component of architecture 100.

Note that police emergency alert system 220, health emergency alert system 230, and/or other emergency alert system 240 may be simultaneously configured to communicate with alert gateway 110 or other devices, or each of these systems may be the only system configured to communicate with alert gateway 110 or other devices of architecture 100. An combination of these and other emergency systems operated by any entity are contemplated. In some embodiment, such systems are also configured to communicate with one another, thus increasing the utility of the systems. For example, fire emergency systems may be configured to communicate with health emergency systems so that injured people can be identified to the health emergency system when identified by the fire emergency system. Each of police emergency alert system 220, health emergency alert system 230, and/or other emergency alert system 240 may be composed of any number and type of devices, and may communicate with alert gateway 110 and/or other devices of architecture 100 using any effective means, including wired and wireless communications means, and secured and unsecured communications methods.

Note also that police emergency alert system 220, health emergency alert system 230, and/or other emergency alert system 240, or any other system interacting with architecture 100, may be configured to transmit emergency alert messages, receive responses to emergency alert messages from user device, or both. When multiple agencies are configured to communicate with alert gateway 110 and/or other devices of architecture 100, responses from user may be detected my multiple agencies upon receipt, thus speeding the communication of potentially vital information to the emergency agencies. Note that for reasons of coordination, transmitting and receiving agency systems may be limited to a single or a specific number of agencies, while in other embodiments any agency configured to communicate with alert gateway 110 and/or other devices of architecture 100 may be able to transmit emergency alert messages and receive responses to such messages.

In one embodiment, a source, such as source 103 shown in FIG. 1, may be associated specifically with the originating agency. For example, if the three emergency systems shown in FIG. 2 are all configured to communicate with alert gateway 110 and/or other devices of architecture 100, and police emergency alert system 220 transmits emergency alert message 101, emergency alert message 101 may be associated with or appended to a source MSISDN associated with police emergency alert system 220. Accordingly, when a response message, such as response message 171, is composed and transmitted, it may be transmitted to the address or number associated with the MSISDN associated with police emergency alert system 220. Such a message may or may not be accessible to other emergency systems configured to communicate with alert gateway 110 and/or other devices of architecture 100.

In another embodiment, emergency alert messages, regardless of the originating agency, provider, or system, may be customized based on the intended recipients. In one embodiment, user profile database 210 may be communicatively connected to alert gateway 110 and/or to any other device or component of architecture 100. User profile database 210 may store data relating to user and/or user group preferences, characteristics, locations, associated device characteristics and capabilities, and/or any other data that may be used to customize an emergency alert message. For example, particular users may prefer to receive abbreviated emergency alert messages while other may prefer to receive detailed emergency alert messages. Some users may prefer to receive multimedia content while other users may prefer to receive text-only messages. Some user devices may not be capable of receiving multimedia messages, and all such users having such devices may be grouped in a category. Any preference, condition, characteristic, or attribute of a device, user, user group, or any other organization of data may be implemented, and all such data may be stored on user profile database 210. Note the user profile database 210 may be one physical device or a collection of more than one device representing one or more databases containing the data as described herein. All such embodiments are contemplated as within the scope of the present disclosure.

In one embodiment, emergency alert message 201 may originate with an agency system such as police emergency alert system 220, health emergency alert system 230, and/or other emergency alert system 240. The agency system, and/or alert gateway 110, may gather preferences from user preference database 210 while composing emergency alert message 201. Such preferences may the be used to customize emergency alert message 201 for an individual user, for example "user A", who may be the user of wireless device 164. Alternatively, an agency system and/or alert gateway 110 may customize emergency alert message 201 for one or more groups of users. Users may be grouped into categories according to certain traits or preferences, and their associated data may be stored in user profile database 210. Such data may then be used to create customized messages based on the group traits or preferences. Any other means of customizing an emergency alert message based on user, user group, or device preference, condition, characteristic, or attribute of a device, user, user group, or any other organization of data may be implemented.

Figure 3:
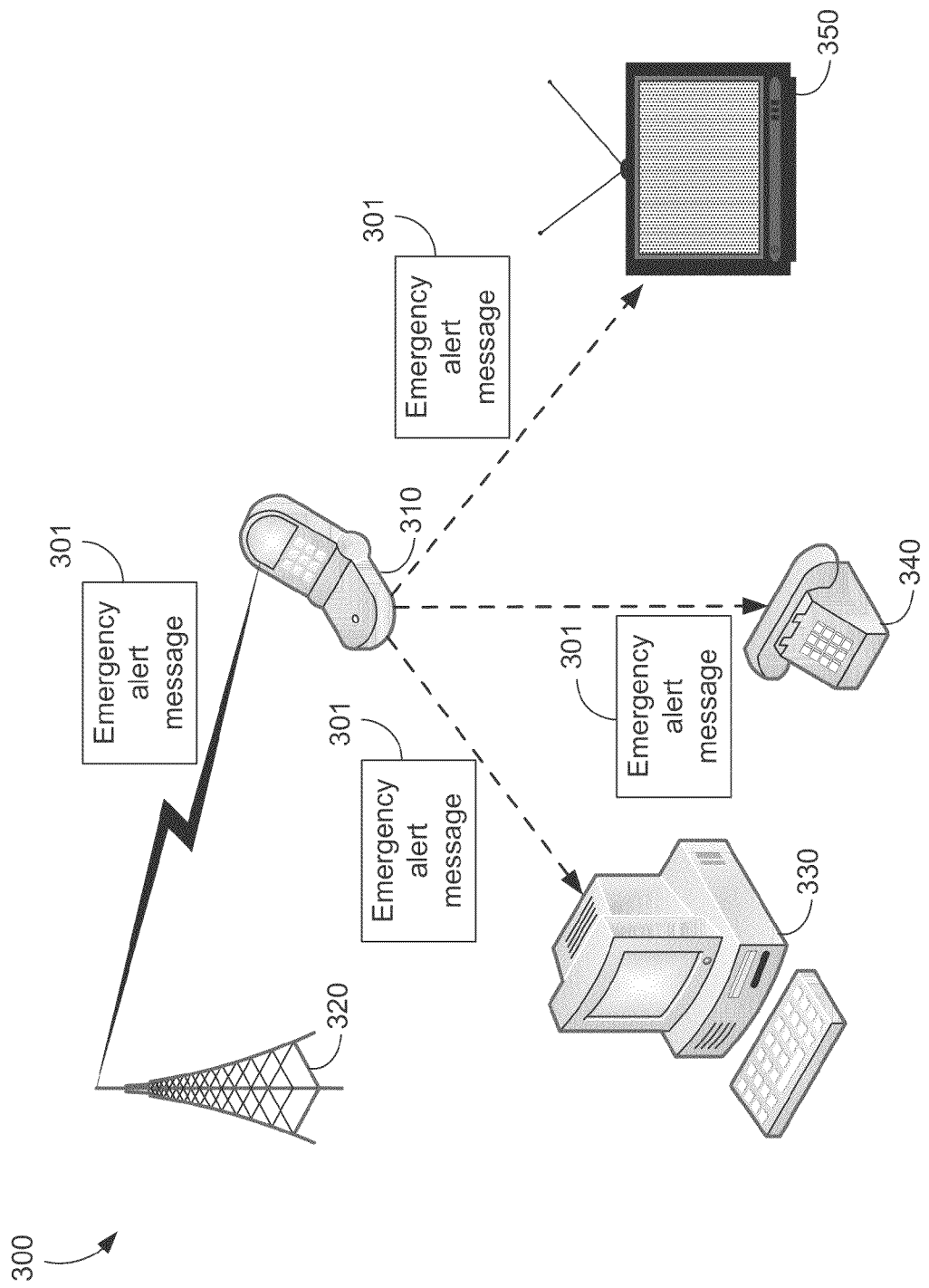
FIG. 3 is a block diagram of a non-limiting, exemplary system in which interactive personal emergency communications may be implemented.

In some embodiments, emergency alert messages may be transmitted to other devices in addition to wireless devices such as mobile telephones, thus expanding the utility of current emergency alert systems and increasing the likelihood that emergency alert messages will be received by affected users. FIG. 3 illustrates a system 300 in which the present disclosure may be implemented. Emergency alert message 301 and associated data may be transmitted from element 320, which may be a base station transceiver or node B as described herein, or any other wireless network device or component capable of transmitting a communication to an end user device. Emergency alert message 301 may be any type of emergency alert message as described herein, and may contain any type and quantity of data, multimedia content, source and destination data, or any other content. All such embodiments are contemplated as within the scope of the present disclosure.

Emergency alert message 301 may be received at wireless device 310, which may be any type of wireless communications device, including a mobile telephone, PDA, mobile computer, etc. Wireless device 310 may be configured to transmit received emergency alert messages to other devices, such as computer 330, which may be any type of computing device or collection of computing components, telephone 340, which may be any type wireline or wireless telephone that may be corded or cordless, and/or television 350, which may be any type of television or video display device. Wireless device 310 may transmit emergency alert message 301 to any one or more of these devices, or any other device configured to receive such communications, using any wired or wireless technology. For example, wireless device 310 may use BLUTOOTH®, WiFi, near field communications, or any other wireless technology to communicate emergency alert message 301 to one or more of devices 330, 340, and 350.

Wireless device 310 may be configured to automatically transmit received emergency alert message 301 to one or more of devices 330, 340, and 350. For example, a user may configure wireless device 310 with an option to automatically transmit such emergency messages to specific devices, or to any device with which wireless device 310 can obtain a communications connection. Alternatively, wireless device 310 may be configured by default to transmit such messages to one or more other devices. In another embodiment, a user may be alerted to emergency alert message 301 on wireless device 310, and may manually instruct wireless device 310 to transmit emergency alert message 301 to one or more of devices 330, 340, and 350. A user may operate wireless device 310 to select one or more of devices 330, 340, and 350, and may operate wireless device 310 to transmit emergency alert message 301 unchanged, or may operate wireless device 310 to transmit a manipulated version of emergency alert message 301. A user may be permitted to manipulate emergency alert message 301 on wireless device 310 through the operation of software, hardware, or a combination of software and hardware, configured to allow such manipulation. Any other combination of message transmission, selection of message destination, and configuration that allows manipulation of a message is contemplated as within the scope of the present disclosure.

A response message may also be composed and transmitted using one or more of devices 330, 340, and 350. Such devices may obtain destination address or number data as described herein and may allow a user to compose a response to emergency alert message 301. Such devices may then transmit the response message to wireless device 310 for transmission back to the originating agency or device via element 320, or such devices may transmit the response message directly if configured to do so. Alternatively, a response message may be composed and transmitted to wireless device 310, which may then transmit the response message using destination address or number data obtained by wireless device 310 from the original emergency alert message 301. Any combination of devices or components used to compose a response message and transmit such a message to an appropriate destination may be implemented.

Figure 4:
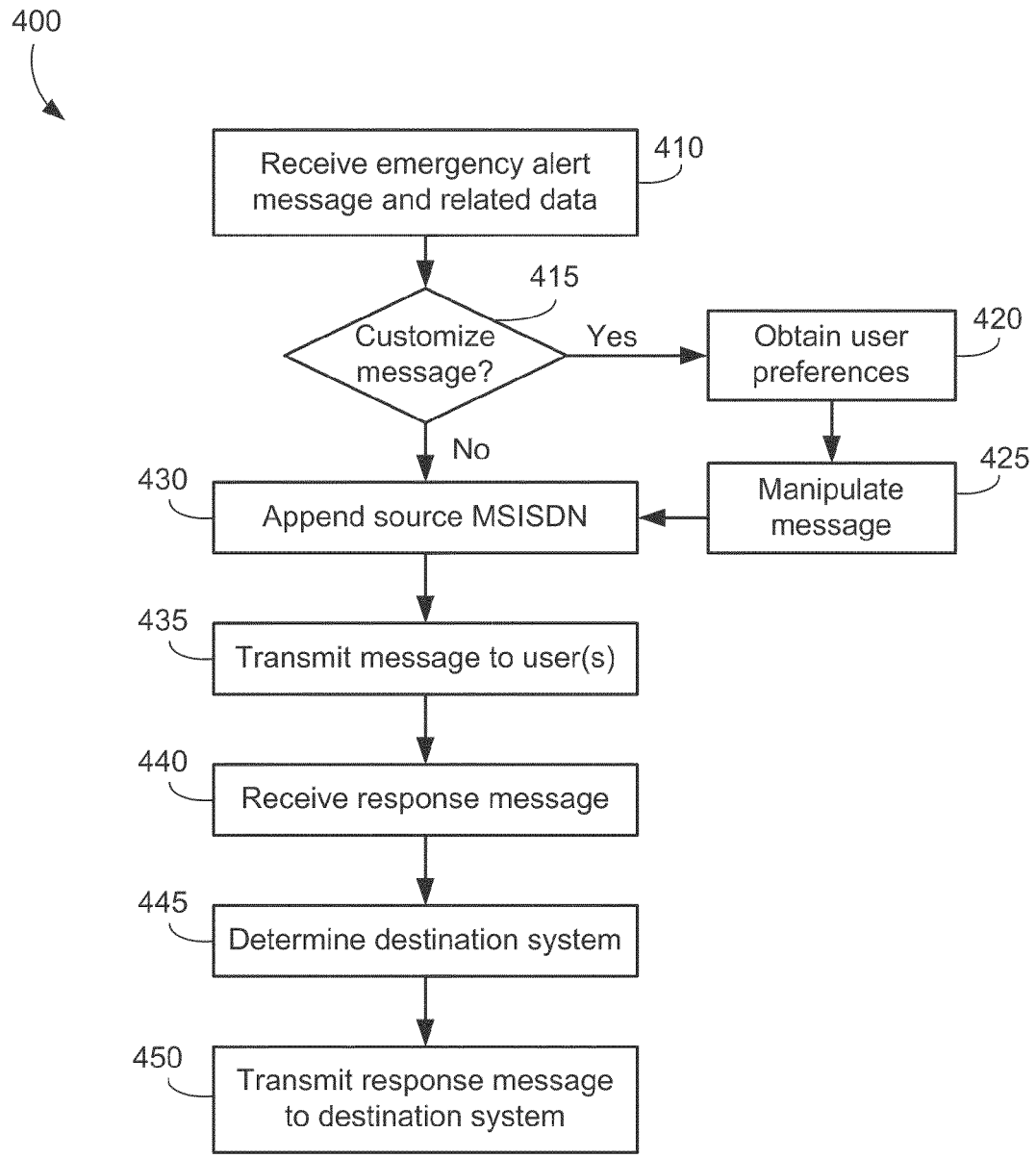
FIG. 4 is a flow diagram of an exemplary, non-limiting method of implementing interactive personal emergency communications.

FIG. 4 illustrates method 400 of processing and transmitting one or more emergency messages and processing and transmitting one or more response messages. Method 400 may be performed at a device such as an alert gateway as described herein, at another device in a system such as architecture 100 of FIGS. 1 and 2, or at any other appropriately configured device, component, or system. At block 410, an emergency message may be received. This message may originate with a user operating or communicating with a device such as an alert gateway, or it may originate with an external system such as the police and health systems described herein in regard to FIG. 2.

At block 415, a determination can be made as to whether to customize an emergency alert message. Emergency alert messages may be customized as described herein to take into account user, user group, and/or device preferences, attributes, or other characteristics. Alternatively, the message received at block 410 may already be customized by the originating system or device. If an emergency alert message is to be customized, at block 420, user, user group, and/or device preferences, attributes, or other characteristic are obtained. These may be obtained from a database or other device or system as described herein, or may be included in the original message and used to manipulate the original message. At block 425, manipulation of the emergency alert message can be performed.

If the message received at block 410 is not to be customized, or following the manipulation of the message at block 425, an identifier of the originating system or device is appended to the emergency alert message at block 430. This may be an MSISDN associated with the originating device or system, or any other number, code, identifier, or other data that maybe used to determine or obtain identifying data about an originating device or system. By appending such data, the recipient device may be able to determine how to address or direct a response message. At block 435, the emergency alert message may be transmitted to one or more user devices. The appropriate user devices and/or their associated destination addresses, numbers, or other destination data may be determined using any effective means, and all such means are contemplated as within the scope of the present disclosure.

At block 440, a response message maybe received for a device to which the emergency alert message has been transmitted. This response message may be any type of response message that a user device is capable of transmitting, and may include multimedia content. At block 445, a destination system is determined for the response message. In one embodiment, an alert gateway may determine which emergency service provider or agency system is addressed or references in the response message. Alternatively, an alert gateway may be configured to transmit all or certain types of response messages to a particular system, device, or agency. At block 450, the response message is transmitted to the appropriate destination system.

Figure 5:
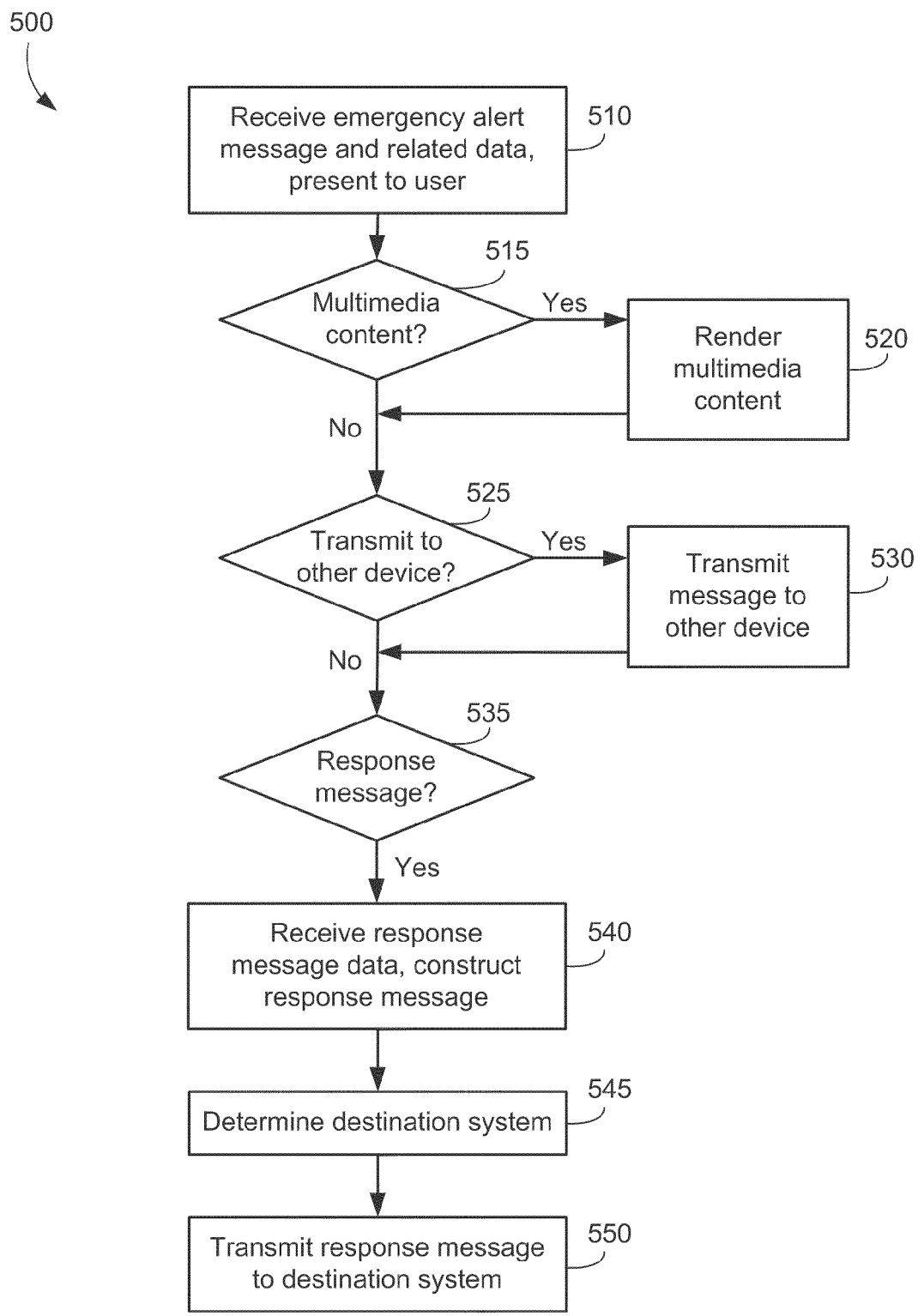
FIG. 5 is a flow diagram of another exemplary, non-limiting method of implementing interactive personal emergency communications.

FIG. 5 illustrates method 500 of receiving and processing an emergency alert message and composing and transmitting a response message. Method 500 may be performed on an end-user device, such as wireless devices 161, 162, 163, 164. and 310, or on any other device or system configured to receive emergency alert messages. At block 510, an emergency alert message and associated data may be received. The text portion of the message may be presented to the user upon receipt of the message.

At block 515, a determination can be made as to whether the emergency alert message includes multimedia content. If so, and in one embodiment, upon receiving a command from a user of the device, the multimedia content may be rendered on the device at block 520. Alternatively, multimedia content may be rendered automatically upon receipt of the emergency alert message. In yet another embodiment, a user may configure a device to automatically or manually render multimedia content based on user preferences. Any other means of configuring a device to render multimedia content may be used.

If there is no multimedia content, or if the multimedia content has been rendered or otherwise accommodated, at block 525 a determination may be made as to whether the emergency alert message and/or associated data and content is to be transmitted to another device. If so, then the emergency alert message and associated data may be transmitted to the other device at block 530. In one embodiment, the determination may be based on receiving a user instruction or detecting a user command to transmit the emergency alert message and/or related content and data to another device. Alternatively, a user device may be configured by a user or by default to automatically transmit emergency alert messages and/or related data to other devices. Emergency alert messages may be transmitted to other devices using any effective means, including wired communications means and wireless communications means, including short distance wireless protocols such as BLUETOOTH® and WiFi, or other near field communications.

Whether or not the emergency alert message and/or related data is to be transmitted to another device, at block 535 a determination may be made as to whether a response message is to be composed and transmitted. This determination may be based on user input instructing the device receiving the emergency message to construct and transmit a response message.

Alternatively, a user device may be configured to automatically respond to received alert messages of any type or of a particular type or content.

At block 540, the content and/or data of a response message may be received. This content or data may include text entered by a user, and/or multimedia content such as images, video, audio, or any other type of message content. Once the content is received, the response message data may be constructed and prepared for transmission. At block 545, the destination system, number, address, or other destination data may be determined. This data may be derived from a source identifier, such as an MSISDN, that accompanied the emergency alert message received at block 510, or may be determined using any other effective means. At block 550, the response message may be transmitted to the determined destination system, number, address, agency, etc.

Note that a response message may be composed on a separate device from the device that initially received the emergency alert message at block 510. For example, if at block 530 the emergency alert message was transmitted to a home computer from a wireless device, a user may operate the home computer to compose a response message and transmit the response message to the wireless device from the home computer, which may be received by the wireless device at block 540. The wireless device may then transmit the response message to the destination at block 550. In such an embodiment, either the wireless device or the home computer (or any other device) may determine the destination data at block 545.

Figure 6:
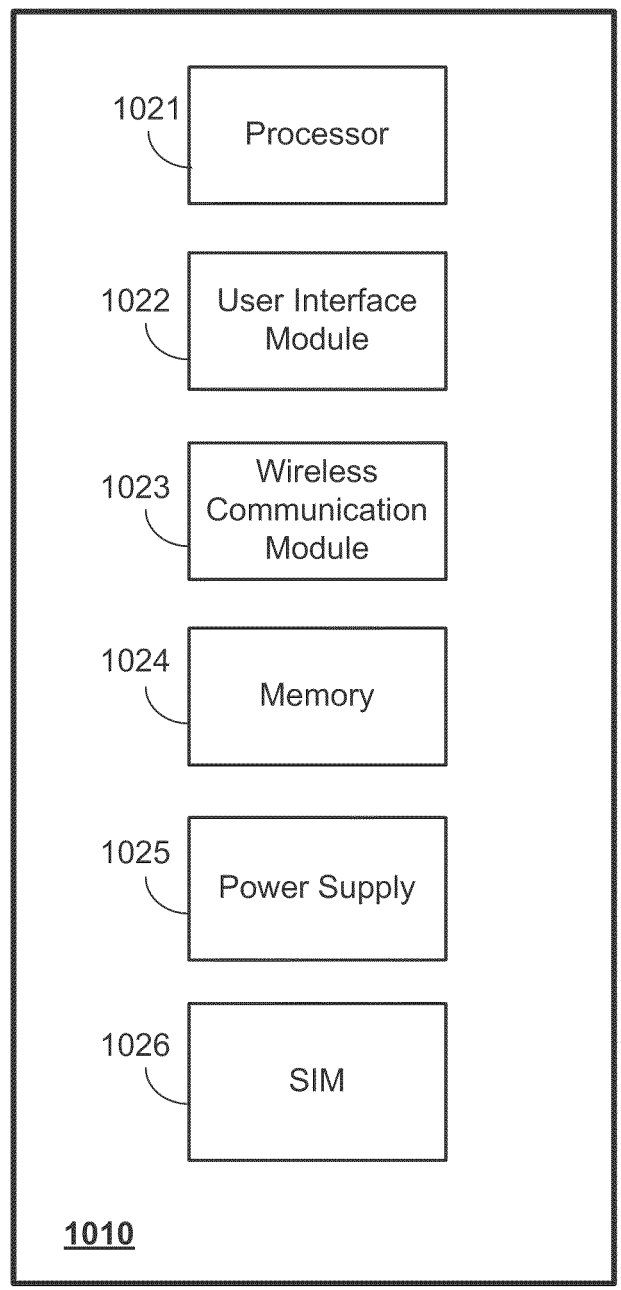
FIG. 6 is a block diagram of a non-limiting, exemplary wireless device that may be used in connection with interactive personal emergency communications.

FIG. 6 illustrates an example wireless device 1010 that may be used in connection with an embodiment. References will also be made to other figures of the present disclosure as appropriate. For example, wireless devices 161-164 and 310 may each be a wireless device of the type described in regard to FIG. 6, and may have some, all, or none of the components and modules described in regard to FIG. 6. It will be appreciated that the components and modules of wireless device 1010 illustrated in FIG. 6 are illustrative, and that any number and type of components and/or modules may be present in wireless device 1010. In addition, the functions performed by any or all of the components and modules illustrated in FIG. 6 may be performed by any number of physical components. Thus, it is possible that in some embodiments the functionality of more than one component and/or module illustrated in FIG. 6 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to transmitting and receiving telephonic communications including emergency alert messages and/or responses to such message in any form, communicating with, operating, or interfacing with a wireless provider network, and/or running software configured to operate, communicate, or interface with a wireless provider network, for example. User interface module 1022 may be any type or combination of hardware and/or software that enables a user to operate and interact with wireless device 1010, and, in one embodiment, to interact with a system or software enabling the user to view, modify, or delete an emergency alert message such as those described herein, and/or a system or software enabling the user to view, modify, or delete related software objects. For example, user interface module 1022 may include a display, physical and "soft" keys, voice recognition software, microphone, speaker and the like. Wireless communication module 1023 may be any type or combination of hardware and/or software that enables wireless device 1010 to communicate with network equipment and other devices, for example, Base Transceiver Stations/Node Bs 151-153 or any other type of wireless communications network or network equipment. Memory 1024 enables wireless device 1010 to store information, such as emergency alert messages, content, data, and/or user, user group, or device preferences and attributes. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 7:
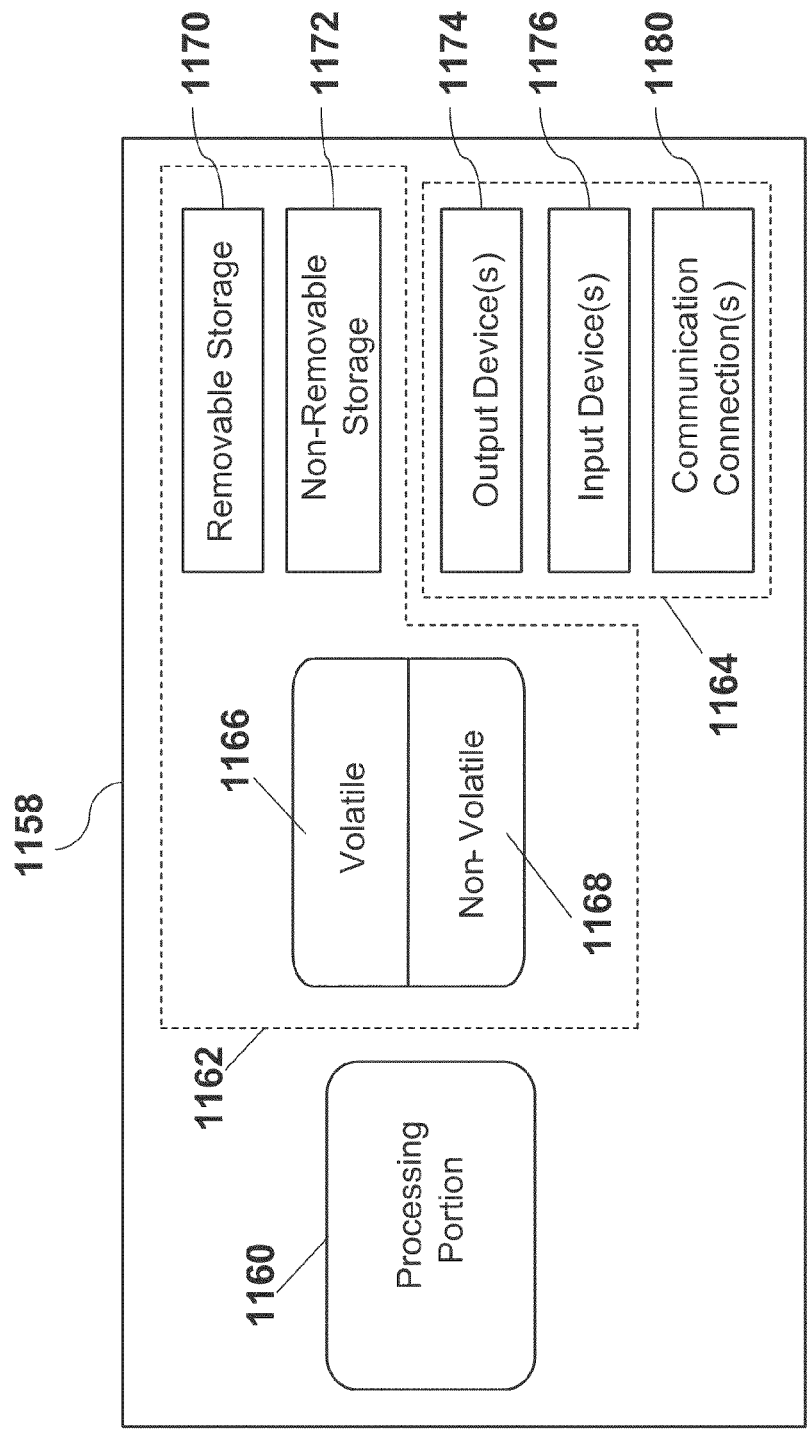
FIG. 7 is a block diagram of a non-limiting, exemplary processor in which interactive personal emergency communications may be implemented.

FIG. 7 is a block diagram of an example processor 1158 which may be employed in any of the embodiments described herein, including as one or more components of wireless devices 161-164 and 310, as one or more components of network equipment or related equipment, such as any component shown in FIGS. 1-3, and/or as one or more components of any third party system or subsystem that may implement any portion of the subject matter described herein, such as alert gateway 110 or systems 220, 230, and 240. It is emphasized that the block diagram depicted in FIG. 7 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 1160, memory portion 1162, and input/output portion 1164 are coupled together (coupling not shown in FIG. 7) to allow communications between these portions. The input/output portion 1164 is capable of providing and/or receiving components, commands, and/or instructions, utilized to, for example, customize emergency alert messages or any other type of cell broadcast or wireless communications means.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing emergency alert messages or preferences, message display applications, telephonic communications, etc. For example, the memory portion is capable of storing user preferences and/or software capable of processing emergency alert messages. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through wireless network equipment as illustrated in FIGS. 1 and 2. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Networks and equipment as illustrated in FIGS. 1 and 2 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how cell broadcasts may be implemented with stationary and non-stationary network structures and architectures in order to implement interactive personal emergency communications. It can be appreciated, however, that methods and systems for interactive personal emergency communications such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for interactive personal emergency communications can be applied independently of the method of data transport, and do not depend on any particular network architecture, or underlying protocols.

Figure 8:
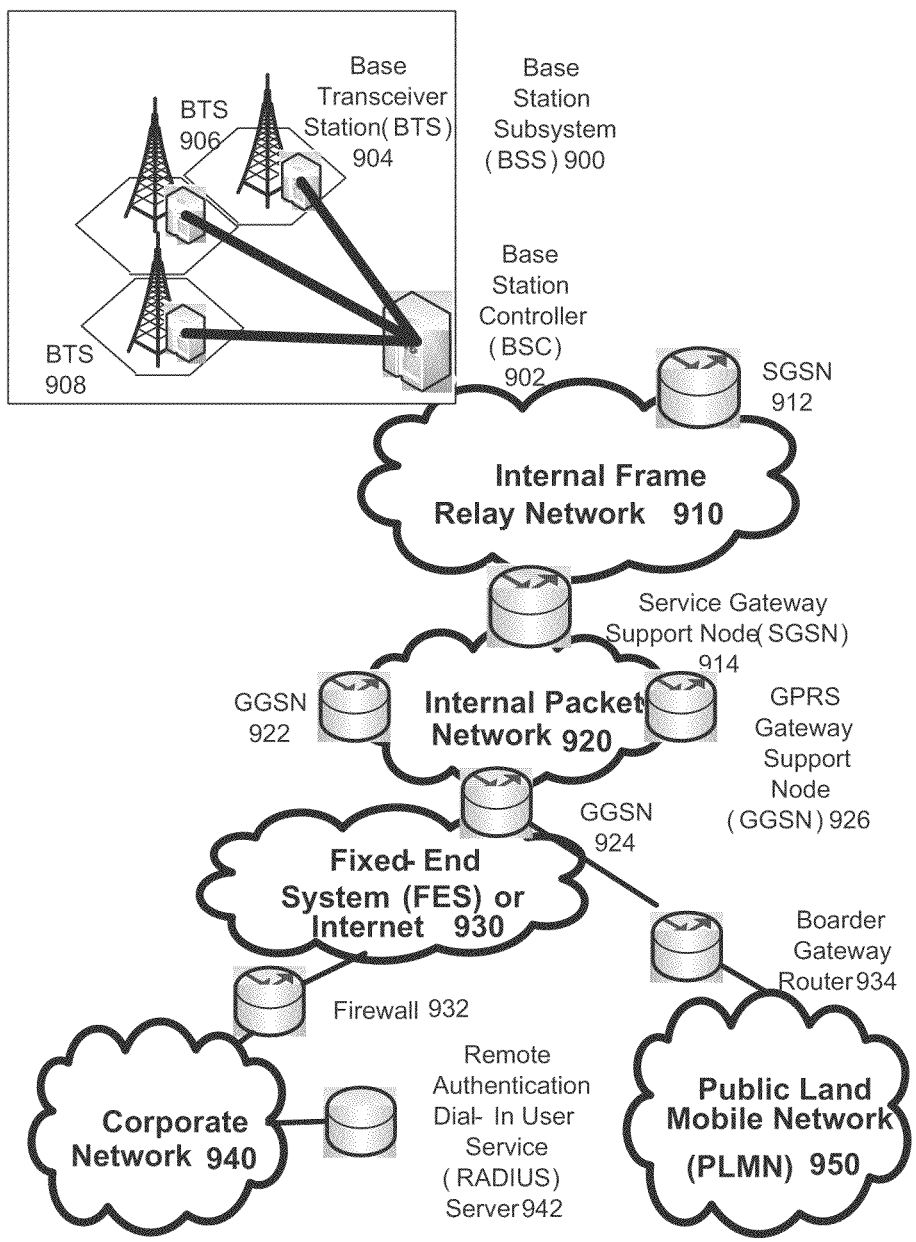
FIG. 8 is an overall block diagram of an exemplary packet-based mobile cellular network environment, such as a GPRS network, in which interactive personal emergency communications may be implemented.

FIG. 8 depicts an overall block diagram of an exemplary packet-based mobile cellular network environment, such as a GPRS network, in which the systems and methods for interactive personal emergency communications such as those described herein can be practiced. In an example configuration, the network equipment as illustrated in FIGS. 1 and 2 may be encompassed by the network environment depicted in FIG. 8. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 161-164 and 261-264) become connected to the wireless network. In exemplary fashion, the packet traffic originating from user devices (e.g., wireless devices 161-164 and 261-264) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 9:
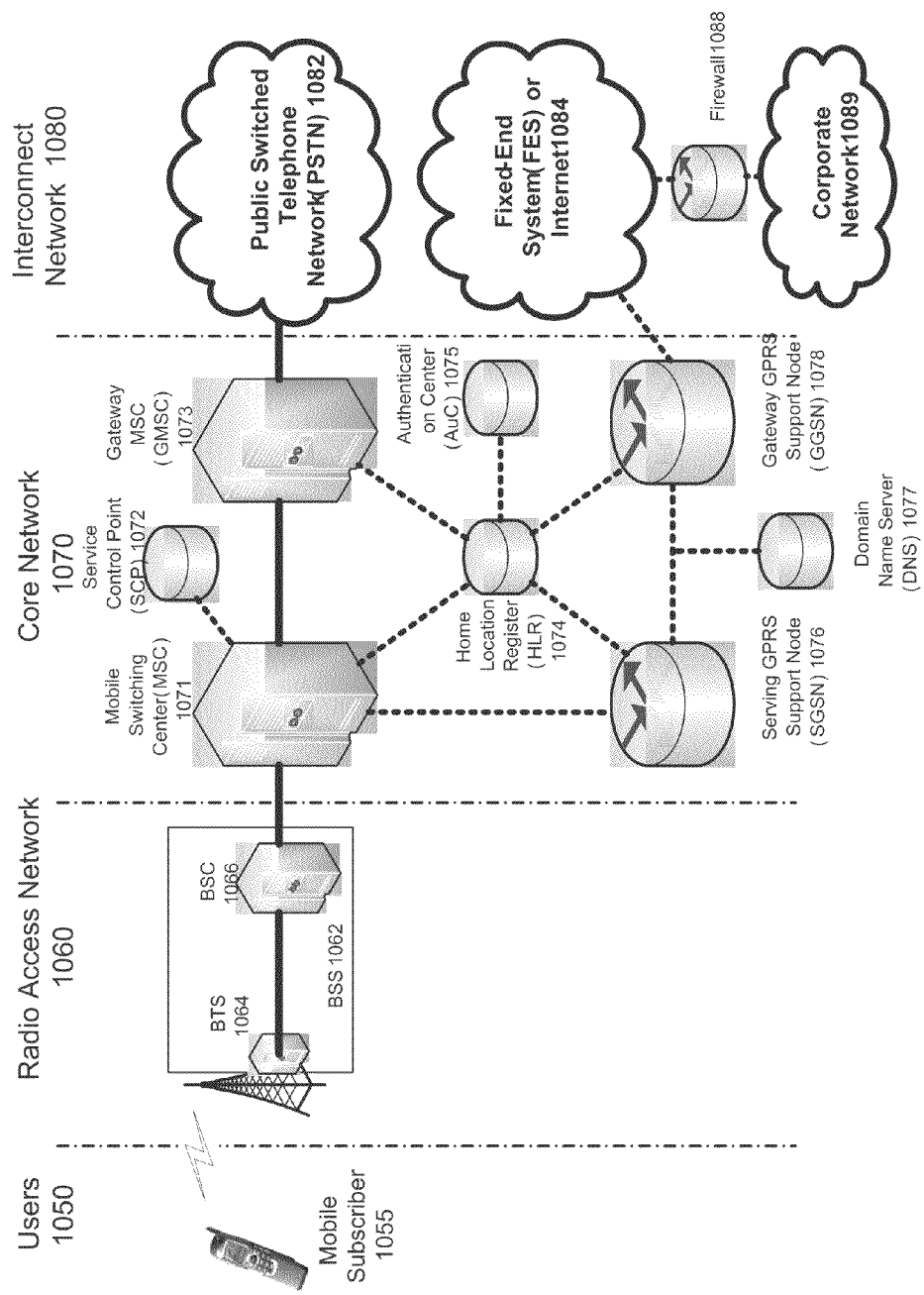
FIG. 9 illustrates a non-limiting, exemplary architecture of a typical GPRS network as segmented into four groups in which interactive personal emergency communications may be implemented.

FIG. 9 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 9). In an example embodiment, the device depicted as mobile subscriber 1055 may comprise wireless devices 161-164 and 310. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 9, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 161-164 and 310, used by an end user of the mobile cellular service or a wireless communications network. When a mobile subscriber turns on his or her mobile device, the mobile device may go through an attach process by which the mobile device attaches to an SGSN of the GPRS network. In FIG. 9, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of interactive personal emergency communications such as those described herein can include but are not limited to Gateway GPRS Support Node tables, Fixed End System router tables, firewall systems, VPN tunnels, and any number of other network elements as required by the particular digital network.

Figure 10:
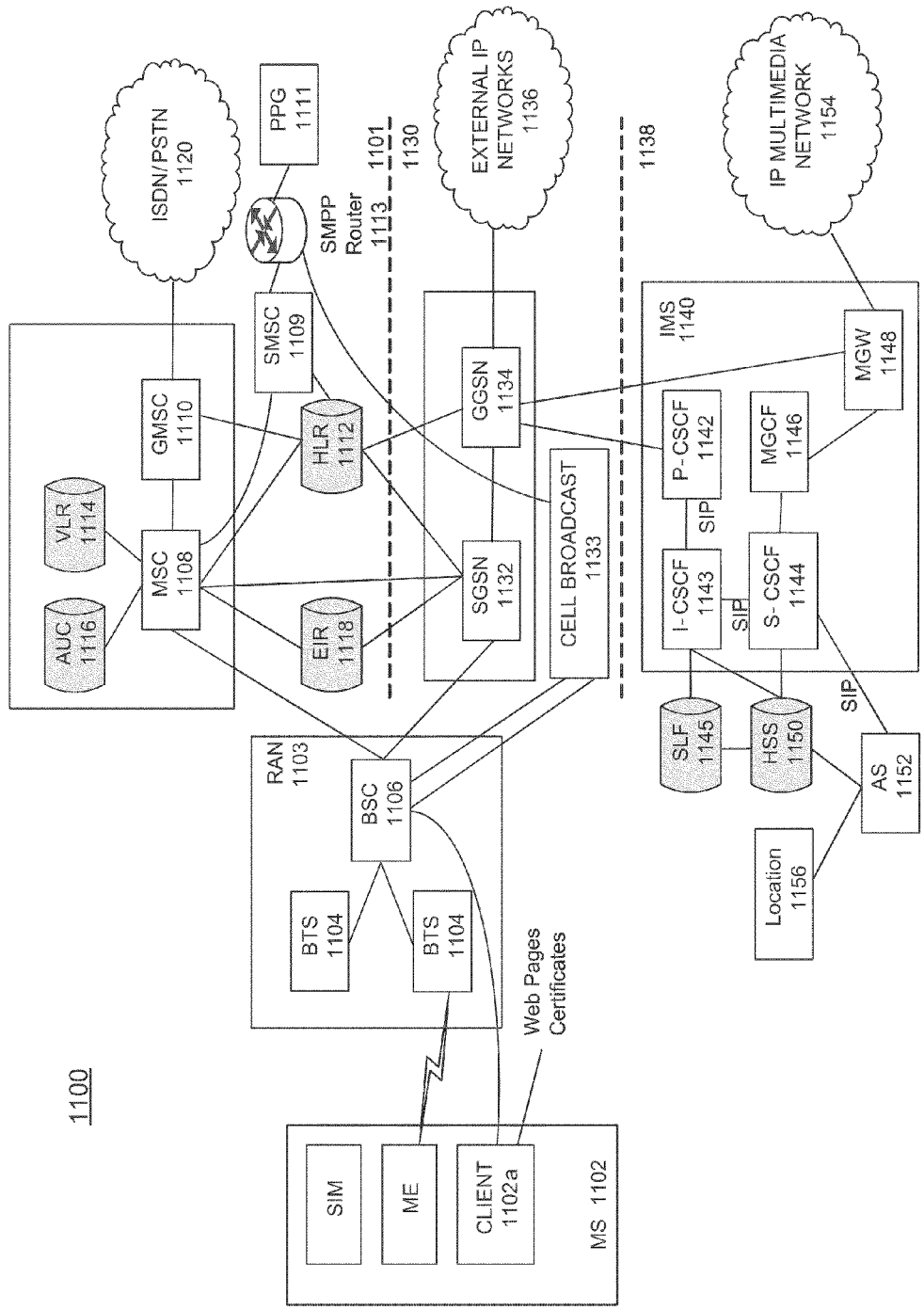
FIG. 10 illustrates a non-limiting alternate block diagram of an exemplary GSM/GPRS/IP multimedia network architecture in which interactive personal emergency communications may be implemented.

FIG. 10 illustrates another exemplary block diagram view of a GSM/GPRS/IP multimedia network architecture 1100 in which the systems and methods for interactive personal emergency communications such as those described herein can be incorporated. As illustrated, architecture 1100 of FIG. 10 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 161-164 and 261-264) that is used by mobile subscribers, on one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include interactive personal emergency communications preferences. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain interactive personal emergency communications preferences. The HLR 1112 and the VLR 1114, together with the MSC 1108, may provide the call routing and roaming capabilities of GSM, as well as interactive personal emergency communications functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types:

an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile, including interactive personal emergency communications preferences, and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for interactive personal emergency communications such as those described herein have been described in connection with various communications devices and computing devices/processors, the underlying concepts can be applied to any communications or computing device, processor, or system capable of implementing the interactive personal emergency communications systems and methods described. The various techniques described herein can be implemented in connection with hardware or software or, where appropriate, with a combination of both. Thus, the methods and apparatuses for interactive personal emergency communications, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for interactive personal emergency communications. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for interactive personal emergency communications as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for an interactive personal emergency communications system. When implemented on a general-purpose processor, the program code combines with the processor to provide a unique apparatus that operates to invoke the functionality of an interactive personal emergency communications system. Additionally, any storage techniques used in connection with an interactive personal emergency communications system can invariably be a combination of hardware and software.

While the systems and methods for interactive personal emergency communications have been described in connection with the various embodiments of the various figures, it is to be understood that other similar embodiments can be used or modifications and additions can be made to the described embodiments for performing the same functions of an interactive personal emergency communications system without deviating from the described systems and methods. For example, one skilled in the art will recognize that an interactive personal emergency communications system as described in the present application may apply to any environment, whether wired or wireless, and may be applied to any number of such devices connected via a communications network and interacting across the network. Therefore, interactive personal emergency communications systems such as those described herein should not be limited to any single embodiment, but rather should be construed in breadth and scope in accordance with the appended claims.

What is claimed is:

1. An emergency alert gateway comprising:
a memory comprising computer instructions; and
a processor coupled to the memory, wherein, when executing the computer instructions, the processor effectuates operations comprising:
receiving an emergency alert message from an emergency services provider device;
determining a respective user group for each device in a set of destination devices;
determining a subset of destination devices from among the set of destination devices, wherein each device in the subset of destination devices is associated with a first user group;
determining a device characteristic for the subset of destination devices based on the first user group;
modifying the emergency alert message based on the device characteristic;
appending an address of the emergency services provider device to the emergency alert message;

generating a modified emergency alert message; and transmitting the modified emergency alert message to the subset of destination devices.

2. The emergency alert gateway of claim 1, wherein the operations further comprise modifying the emergency alert message based on a user preference.

3. The emergency alert gateway of claim 1, wherein the address of the emergency services provider device is a mobile subscriber integrated services digital network number.

4. The emergency alert gateway of claim 1, wherein the operation of modifying the emergency alert message based on the device characteristic comprises altering multimedia content of the emergency alert message.

5. The emergency alert gateway of claim 1, wherein the emergency alert message comprises multimedia content.

6. The emergency alert gateway of claim 1, wherein operations further comprise querying a database for the device characteristic.

7. A non-propagating computer-readable storage medium comprising executable instructions that when executed by a processor cause the processor to effectuate operations comprising:

receiving an emergency alert message from an emergency services provider device;

determining a respective user group for each device in a set of destination devices;

determining a subset of destination devices from among the set of destination devices, wherein each device in the subset of destination devices is associated with a first user group;

determining a device characteristic for the subset of destination devices based on the first user group;

modifying the emergency alert message based on the device characteristic;

appending an address of the emergency services provider device to the emergency alert message;

generating a modified emergency alert message; and transmitting the modified emergency alert message to the subset of destination devices.

8. The non-propagating computer-readable storage medium of claim 7, wherein the operation of modifying the emergency alert message based on the device characteristic comprises altering multimedia content of the emergency alert message.

9. The non-propagating computer-readable storage medium of claim 7, wherein the operations further comprise modifying the emergency alert message based on a user preference.

10. The non-propagating computer-readable storage medium of claim 7, wherein the address of the emergency services provider device is a mobile subscriber integrated services digital network number.

11. The non-propagating computer-readable storage medium of claim 7, wherein the emergency alert message comprises multimedia content.

12. The non-propagating computer-readable storage medium of claim 7, wherein operations further comprise querying a database for the device characteristic.

13. A method comprising:

receiving an emergency alert message from an emergency services provider device at an alert gateway;

determining, on the alert gateway, a respective user group for each device in a set of destination devices;

determining, on the alert gateway, a subset of destination devices from among the set of destination devices, wherein each device in the subset of destination devices is associated with a first user group;

determining, on the alert gateway, a device characteristic for the subset of destination devices based on the first user group;

modifying, on the alert gateway, the emergency alert message based on the device characteristic to generate a modified emergency alert message;

appending, on the alert gateway, an address of the emergency services provider device to the emergency alert message; and transmitting, from the alert gateway, the modified emergency alert message to the subset of destination devices.

14. The method of claim 13, wherein modifying the emergency alert message based on the device characteristic comprises altering multimedia content of the emergency alert message.

15. The method of claim 13, further comprising querying a database for the device characteristic.

16. The method of claim 13, further comprising receiving a response message from a device from among the subset of destination devices.

17. The method of claim 13, modifying the emergency alert message based on a user preference.

18. The method of claim 13, wherein the address of the emergency services provider device is a mobile subscriber integrated services digital network number.

19. The method of claim 13, wherein the emergency services provider device is at least one of a police emergency alert system or a health emergency alert system.

20. The method of claim 13, wherein the emergency alert message comprises multimedia content.

* * * * *